United States Patent [19]

Clark

[11] Patent Number: 4,964,219

[45] Date of Patent: Oct. 23, 1990

[54] COMBINATION PLUMB/LEVEL INSTRUMENT FOR A TRY SQUARE

[75] Inventor: Gary E. Clark, Sikeston, Mo.

[73] Assignee: Wade Parker, New Madrid, Mo.; a part interest

[21] Appl. No.: 306,061

[22] Filed: Feb. 6, 1989

Related U.S. Application Data

[63] Continuation-in-part of Ser. No. 128,799, Dec. 4, 1987, abandoned.

[51] Int. Cl.$^5$ .......................... G01C 9/20; G01C 9/28
[52] U.S. Cl. ........................................ 33/451; 33/384; 33/388
[58] Field of Search ................. 33/451, 429, 480, 370, 33/371, 372, 379, 384, 388, 484, 485, 347

[56] References Cited

U.S. PATENT DOCUMENTS

| | | | |
|---|---|---|---|
| 649,626 | 5/1900 | Braun | 33/379 |
| 802,879 | 10/1905 | Perks | 33/384 |
| 1,007,303 | 10/1911 | Merriman | 33/388 |
| 1,241,341 | 9/1917 | Chambers | 33/376 |
| 1,298,010 | 3/1919 | Coleman | 33/451 |
| 1,450,296 | 4/1923 | Lucas | 33/388 |
| 1,639,580 | 8/1927 | Thompson | 33/437 |
| 1,963,805 | 6/1934 | Radke et al. | 33/89 |
| 2,277,071 | 3/1942 | Cassell | 33/388 |
| 2,386,833 | 10/1945 | Baldwin | 33/371 |
| 2,660,804 | 12/1953 | Mundy | 33/388 |
| 2,677,192 | 5/1954 | Anderson | 33/372 |
| 2,776,495 | 1/1957 | Dickey | 33/371 |
| 2,782,524 | 2/1957 | Vogt | 33/347 |
| 2,803,062 | 8/1957 | Dutcher | 33/388 |
| 3,187,437 | 6/1965 | Ellis | 33/451 |
| 3,225,451 | 12/1965 | Olexson et al. | 33/207 |
| 3,521,369 | 7/1970 | Jones | 33/370 |
| 4,125,944 | 11/1978 | Esposito et al. | 33/347 |
| 4,194,295 | 3/1980 | Simuro et al. | 33/451 |
| 4,473,957 | 10/1984 | Faulkner | 33/371 |
| 4,653,194 | 3/1987 | Kim | 33/429 |
| 4,660,292 | 4/1987 | Richardson | 33/451 |
| 4,739,561 | 4/1988 | Mills | 33/370 |

FOREIGN PATENT DOCUMENTS 18992  3/1909  United Kingdom ................. 33/371

Primary Examiner—William A. Cuchlinski, Jr.
Assistant Examiner—Patrick R. Scanlon
Attorney, Agent, or Firm—Rogers, Howell & Haferkamp

[57] ABSTRACT

A combination plumb/level device for removable attachment to a try square of magnetizable material to enable the square to be used as a level or a plumb. The device comprises a spirit level, and a holder for the level. The holder has a magnet associated therewith for magnetically gripping one face of a standard, unaltered leg of the try square with the level oriented relative to the face. The magnet associated with the holder is engageable with an edge of the standard, unaltered leg and orients the level with respect to the edge, enabling flatwise application of the other face and edges of the try square to a surface whereby the try square may be used to ascertain level or plumb positions. Other embodiments, including those directed to a device adapted for removable attachment to a try square of non-magnetizable material, are also disclosed.

2 Claims, 2 Drawing Sheets

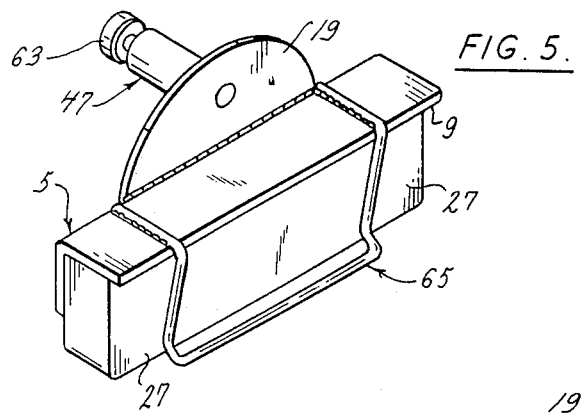
FIG. 5.
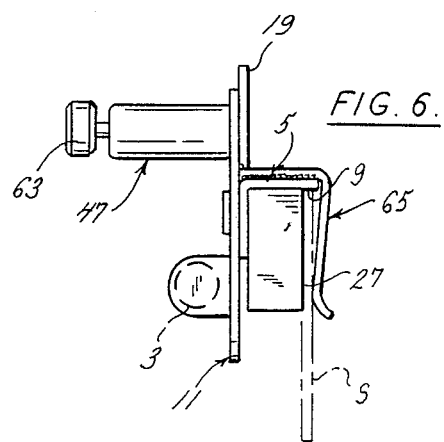
FIG. 6.
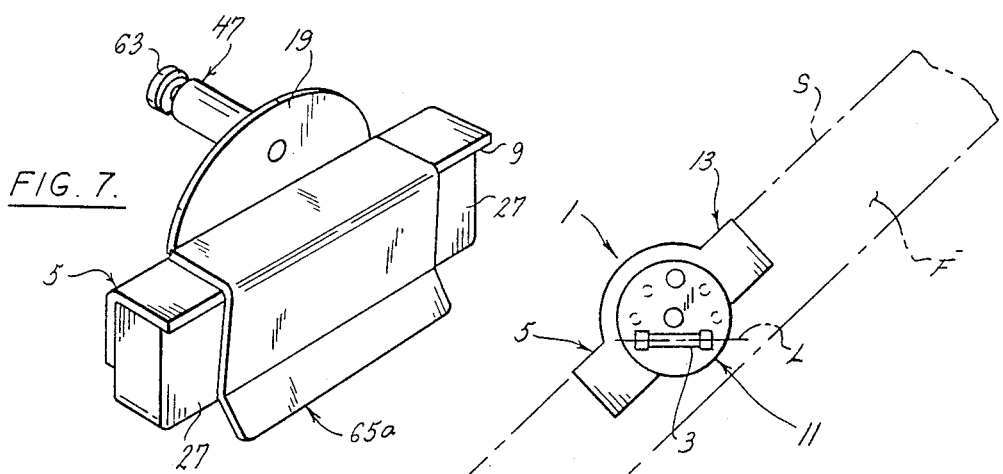
FIG. 7.
FIG. 1.

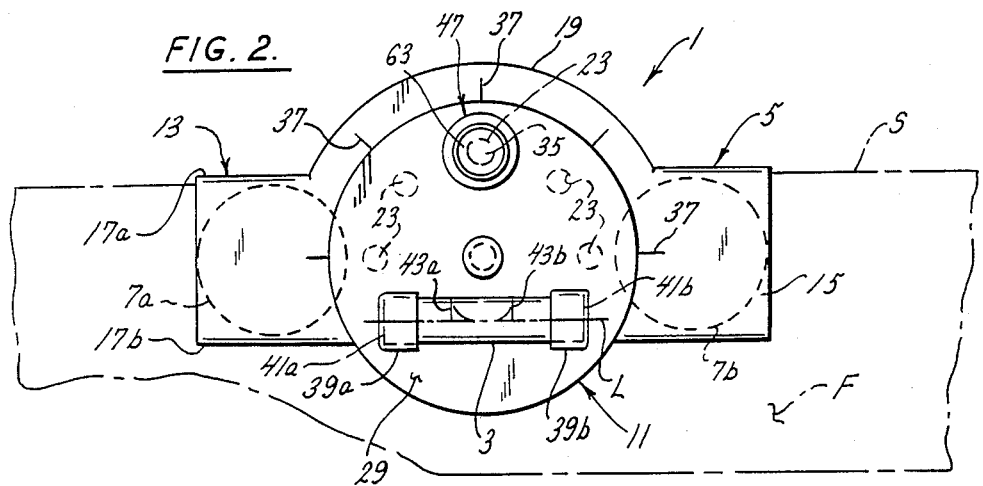
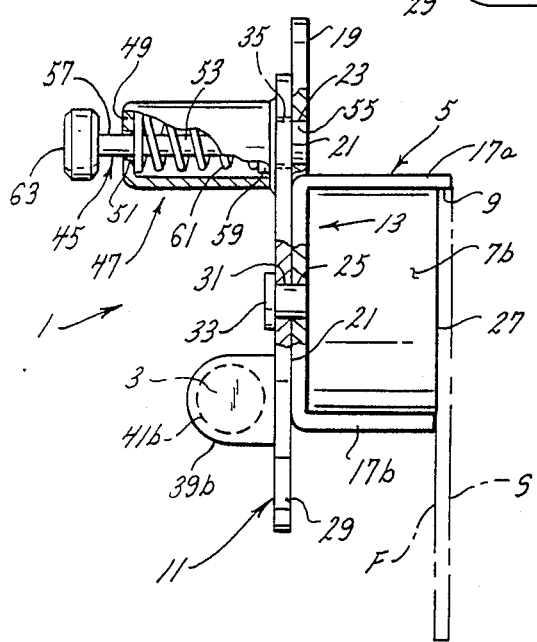
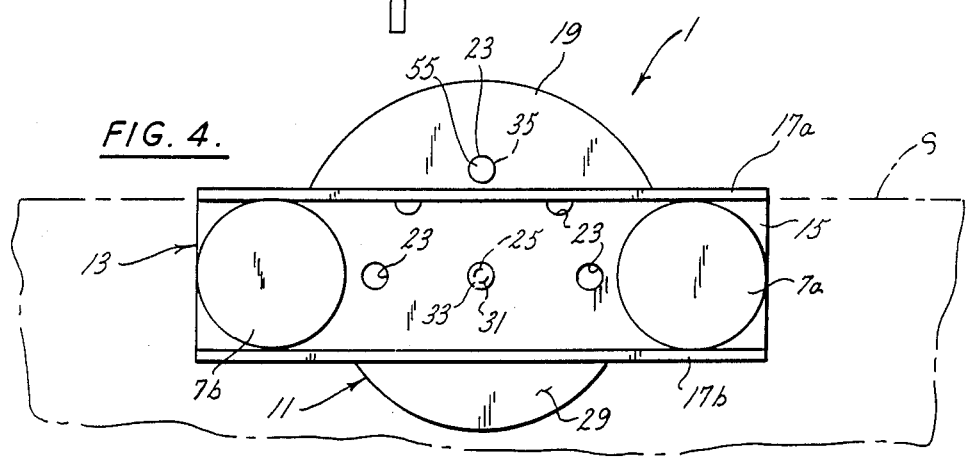

4,964,219

COMBINATION PLUMB/LEVEL INSTRUMENT FOR A TRY SQUARE

Cross-Reference to Related Application

This is a continuation-in-part of U.S. patent application Ser. No. 128,799, filed Dec. 4, 1987 and now abandoned.

Background of the Invention

This invention relates to a combination plumb/level instrument for removable attachment to a try square to permit the use of the try square to ascertain plumb and level positions.

Carpenters, builders and similar craftsmen and artisans must often determine whether a particular structural member is plumb, level or at some desired angle in between. This is accomplished by using a carpenter's level having several spirit level vials mounted with their axes respectively parallel to, perpendicular to and at a 45 degree angle with respect to the longitudinal axis of the level. The carpenter's level is usually about two to three feet long and relatively expensive, bulky and awkward to carry on the job. Those involved in the construction trades typically use and carry a try square as a standard and essential tool to measure lengths and to determine whether two structural elements are positioned at right angles to each other. To have and to carry both a carpenter's square and a carpenter's level is inconvenient and entails the expense of purchasing both tools.

A number of approaches have been taken in attempts to avoid this inconvenience as described, for example, in U.S. Pat. Nos. 1,241,341, 1,298,010, and 1,963,805. However, prior devices have also had various disadvantages such as having level attachments which are inconvenient to attach and remove from the try square and extend beyond opposite faces of the try square thereby preventing an entire surface of the square from being positioned in flatwise engagement with a surface which is to be measured.

Summary of the Invention

Among the several objects of this invention may be noted the provision of an improved plumb/level device which enables a try square to be used as a level or a plumb and which is further adapted for quick and convenient attachment to and detachment from a try square; the provision of such a plumb/level device which enables flatwise engagement of the square, with the device attached thereto, to a surface; the provision of such a plumb/level device which, when attached to a try square, enables one to ascertain angles of inclination between plumb and level; the provision of such a plumb/level device which is easy to use; and the provision of such a plumb/level device holder which is lightweight and economical to manufacture.

Generally, a combination plumb/level device of this invention for removable attachment to a try square of magnetizable material to enable the square to be used as a level or a plumb comprises a spirit level, and a holder for the level having magnet means associated therewith for magnetically gripping one face of a standard, unaltered leg of the try square with the level oriented relative to the face. The magnet means associated with the holder is engageable with an edge of the standard, unaltered leg and orients the level with respect to the edge, enabling flatwise application of the other face and edges of the try square to a surface whereby the try square may be used to ascertain level or plumb positions.

The present invention is also directed to a leveling instrument for removable attachment to a try square of magnetizable material. The instrument comprises a spirit level, a holder comprising a U-shaped channel having a web and generally parallel flanges wherein one flange extends farther than the other flange, the other flange being the shorter flange, by a distance not greater than the thickness of the try square, a permanent magnet secured to the underside of the web of the channel and having a flat undersurface flush with the edge of the shorter flange of the channel, an alignment plate secured to the top side of the web of the channel having a flat surface flush with the web of the channel, the web and alignment plate forming an upper mounting surface having a plurality of alignment holes therein, a generally circular plate rotatable relative to the holder and having a single alignment hole therein adjacent its perimeter, two stanchions secured to the exterior surface of the rotatable plate receiving opposite ends of the level, and a spring-loaded detent carried by the rotatable plate adapted to removably extend through its alignment hole into a selected one of the alignment holes in the alignment plate to position the rotatable plate and the level at a preselected angular position relative to the edge of the channel whereby the try square may be used to ascertain inclinations.

In another embodiment, the present invention is directed to an instrument for removable attachment to a try square to enable the square to be used as a level or a plumb. The instrument comprises a spirit level, a holder for the level having gripping means associated therewith for gripping a standard, unaltered leg of the try square with the level oriented relative to a face of the try square, and an orienting means associated with the holder for engaging an edge of the standard, unaltered leg to orient the level with respect to the edge enabling the try square to be used to ascertain level or plumb positions.

Other objects and features of this invention will be in part apparent and in part pointed out hereinafter.

Brief Description of the Drawings

FIG. 1 is a top plan of a combination plumb/level device of this invention attached to a try square shown in phantom;

FIG. 2 is an enlarged view of FIG. 1 showing the combination plumb/level device and a portion of the square with level being rotated relative to the edge of the square by forty-five degrees from the position shown in FIG. 1;

FIG. 3 is an end elevation of the device as shown in FIG. 2 with parts broken away showing a spring-loaded detent, an alignment hole in the holder and the connection between the holder and the mounting for the level;

FIG. 4 is a bottom plan view of the combination plumb/level device of this invention;

FIG. 5 is an isomteric projection of a second embodiment of a combination plumb/level device of this invention;

FIG. 6 is an end elevation of the device of FIG. 5 attached to a try square shown in phantom; and FIG. 7 is an isomteric projection of a third embodiment of a combination plumb/level device of this invention.

Description of a Preferred Embodiment

Referring now to FIGS. 1 and 2 of the drawings, a combination plumb/level instrument or device of the present invention, designated in its entirety by the reference numeral 1, is shown attached to a carpenter's try square S of steel or other magnetizable material. Briefly, the combination plumb/level device comprises a spirit level 3, and a holder, generally designated 5, for the level having two permanent magnets 7a, 7b bonded thereto for magnetically gripping one face F of a leg of the try square S with the longitudinal axis L of the level parallel to the face F, the holder having a flat lip generally designated 9 engageable with an edge of the leg orienting the level with respect to the edge enabling flatwise application of the other face and edges of the try square to a surface whereby the try square may be used to ascertain level or plumb positions. Mounting means generally designated 11 secure the level to the holder with the longitudinal axis thereof parallel to the face F.

More specifically, the holder 5 comprises a U-shaped channel generally designated 13 having a web 15 and two flanges 17a, 17b with one flange 17a extending farther than the other 17b by a distance substantially equal to the thickness of a try square S. The channel 13 is preferably fabricated from metal for strength and durability, although other materials such as molded synthetic resin is also satisfactory. Secured to one of the flanges 7a, preferably by welding, is a sector-shaped alignment flange or plate 19 having a flat surface flush with the outer surface of web 15. The web and alignment flange form an upper mounting surface 21 of holder 5 and have several alignment holes 23 therein disposed in a generally arc-shaped configuration.

Permanent magnets 7a, 7b are bonded by an epoxy adhesive or the like to the underside of web 15 adjacent each end of the channel. Magnets 7a, 7b are cylindrical with cross sectional diameters slightly smaller than the distance between the interior surfaces of the flanges. The thickness of the magnets is such that with one end of each magnet secured to web 15, the other end, or underside, is flush with the edge of the shorter flange 17b, as shown in FIG. 3. The underside of the magnets 7a, 7b thereby constitutes the undersurface 27 of the holder 5. The magnets may have other shapes as long as they fit between the flanges and have sufficient cross sectional areas to produce a magnetic gripping force sufficient to retain holder 5 against try square S. As illustrated in FIG. 3, the longer flange 17a extends a distance preferably equal to the thickness of the square beyond the undersurface of the holder thereby constituting the flat lip 9 perpendicular to the undersurface 27 of the holder.

Mounting means 11 includes a generally circular plate 29 which overlies the upper mounting surface 21 and is rotatably secured thereto in generally parallel relation to the undersurface 27 of the holder. Plate 29 has an attachment hole 31 located generally in its center and is rotatably secured to the web 15 by means of a headed shaft 33 which extends through the attachment hole 31 in the plate into an attachment hole 25 located in the upper mounting surface 21. The shaft is press fitted into the attachment hole 25 enabling the plate 29 to rotate relative to the holder 5. Adjacent the perimeter of the plate 29 is a single alignment hole 35 spaced from the perimeter such that the alignment hole in the plate may register with any of the alignment holes 23 in the upper mounting surface 21 by rotating the plate 29 relative to the holder 5. Equally spaced marking lines 37 are scribed on the upper mounting surface 21 adjacent the perimeter of the plate 29.

Two stanchions 39a, 39b are secured to the exterior of the plate 29, by epoxy adhesive or the like. The stanchions have sockets 41a, 41b therein slightly larger than the diameter of the vial of level 3. The stanchions are positioned on the plate 29 with their sockets 41a, 41b in concentric relation with respect to one another. Opposite ends of the level 3 are received in the sockets 41a and 41b, and held therein by a friction fit, epoxy cement or other suitable means. The level has two circumferential marking lines 43a, 43b equally spaced from the ends of the level.

A spring-loaded detent generally designated 45 is carried by the plate in a cylindrical housing generally designated 47 having one end secured to the exterior side of the plate 29, the housing being concentric with the alignment hole 35 in the plate and communicating therewith. The free end 49 of the housing has a hole 51 therein concentric with the hole 35 in the plate. The detent 45 comprises a shaft 53 extending through the interior of the housing with an enlarged end 55 passing through coinciding alignment holes in the plate 29 and upper mounting surface 21 and the other shaft end 57 projecting through hole 51 in the free end of the housing. Shaft 57 also has an enlarged circumferential stop within housing 47.

A helical compression spring 61 is located inside the housing 47 and carried by shaft 53. The ends of the spring 61 are disposed against the free end 49 of the housing and the stop 59 on the shaft thereby biasing the shaft 53 to extend through the alignment hole 35 in the plate and a coinciding alignment hole in the upper mounting surface 21. A knob 63 is formed on the outer end of shaft 53 to facilitate retracting enlarged shaft end 55 from the alignment hole in the upper mounting surface 21 against the bias of compression spring 61.

Positioning of a leg of a try square S with the combination plumb/level device 1 is accomplished by first rotating the plate 29 so that the longitudinal axis L of the spirit level 3 forms an angle with an edge of the channel 13 equal to the preselected angle of the leg relative to horizontal. To rotate the plate, the spring-loaded detent 45 is disengaged from an alignment hole in the upper mounting surface 21 by grasping the knob 63 and pulling it away from holder 5. The marking lines 37 on the upper mounting surface are used to properly orient the level 3. Once the plate 29 is sufficiently rotated to properly position the level 3, the detent 45 is engaged by releasing the knob 63 causing the enlarged end 55 of shaft upper mounting surface 21 and the plate 29 to prevent relative rotation therebetween. The combination plumb/level device 1 is then attached to the leg of a try square S by applying the undersurface 27 of the holder to the face of the leg. The holder 5 engages an edge of the face by the lip 9 overhanging the edge with the interior surface of the lip being in flatwise engagement with the edge, as shown in FIG. 3. The orientation of the holder with respect to the edge can thereby be controlled while leaving the other faces and edges of the try square S free for engagement with other surfaces. When the leg of the square has the desired inclination, the spirit level 3 will be horizontal and the bubble therein will locate between the two marking lines 43a, 43b on the level.

Thus, the instrument or device of this invention may be easily attached and removed from a try square and conveniently set to indicate whether the square carrying the device is inclined at a preselected angle. As lip 9 retains the device in accurate alignment with an edge of the square without extending beyond the opposite face, the face of the square not carrying the device and the other edges of the square are free of projections and may thereby be positioned in flatwise contact with surfaces to ascertain angles of inclination.

In a second embodiment, as shown in FIGS. 5 and 6, the plumb/level device of this invention is adapted for use with try squares of non-magnetizable materials, for example, aluminum, plastic or wood, as well as try squares of magnetizable material. In this embodiment, a clip 65 extends from the holder 5 to retain the standard, unaltered leg of a try square by friction between the clip 65 and the undersurface 27 of the holder 5. Clip 65 may comprise a shaped bar folded over and opposite the undersurface 27 as shown in FIG. 5, or may be of contoured sheet form as shown in FIG. 7 and identified as 65a. Preferably, however, the edge of clip 65 opposite the lip 9 is bent outwardly, away from undersurface 27 in order to facilitate engagement with a try square leg. As with the other embodiments, lip 9 orients the level with respect to the edge of the try square leg.

In view of the above, it will be seen that the several objects of the invention are achieved and other advantageous results attained.

As various changes could be made in the above construction without departing from the scope of the invention, it is intended that all matter contained in the above description or shown in the accompanying drawings shall be interpreted as illustrative and not in a limiting sense.

What is claimed is:

1. A leveling instrument for removable attachment to a try square of magnetizable material, comprising:
    a spirit level;
    a holder comprising a U-shaped channel having a web and generally parallel flanges wherein one flange extends farther than the other flange, said other flange being the shorter flange, by a distance not greater than the thickness of the try square;
    a permanent magnet secured to the underside of the web of the channel and having a flat undersurface flush with the edge of the shorter flange of said channel;
    an alignment plate secured to the top side of the web of the channel having a flat surface flush with the web of the channel, the web and alignment plate forming an upper mounting surface having a plurality of alignment holes therein;
    a generally circular plate rotatable relative to the holder and having a single alignment hole therein adjacent its perimeter;
    two stanchions secured to the exterior surface of said rotatable plate receiving opposite ends of the level; and
    a spring-loaded detent carried by the rotatable plate adapted to removable extend through the single alignment hole into a selected one of said alignment holes in said alignment plate to position the rotatable plate and the level at a preselected angular position relative to the flange that extends farther than the shorter flange whereby the try square may be used to ascertain inclinations.

2. An instrument for removable attachment to a try square of magnetizable material to enable the square to be used as a level or a plumb, comprising:
    a spirit level;
    a holder for the level comprising a body having a flat undersurface adapted to be brought into contact with a surface of a leg of the try square, and a U-shaped channel defined by two flanges and a web extending therebetween with one flange extending farther than the other by a distance not greater than the thickness of the try square, thereby constituting a flat lip; and
    magnet means associated with said holder for magnetically gripping a first of two faces of a standard, unaltered leg of the try square with the level oriented relative to said face, said magnet means comprising at least one permanent magnet secured to the underside of the web of said channel, the underside of said magnet constituting the undersurface of the body and being flush with the edge of the shorter flange of said channel;
    said holder having engaging means associated therewith comprising the flat lip extending from said body undersurface a distance not greater than the thickness of the try square, said engaging means being engageable with one of a plurality of edges of said standard, unaltered leg and orienting the level with respect to said edge enabling flatwise application of the second face and other edges of the try square to a surface whereby the try square may be used to ascertain level or plumb positions.

* * * * *